Nov. 23, 1965        H. G. FARRELL           3,219,798
                     HEATED LUNCH BOX
Filed Sept. 10, 1963                    2 Sheets-Sheet 1
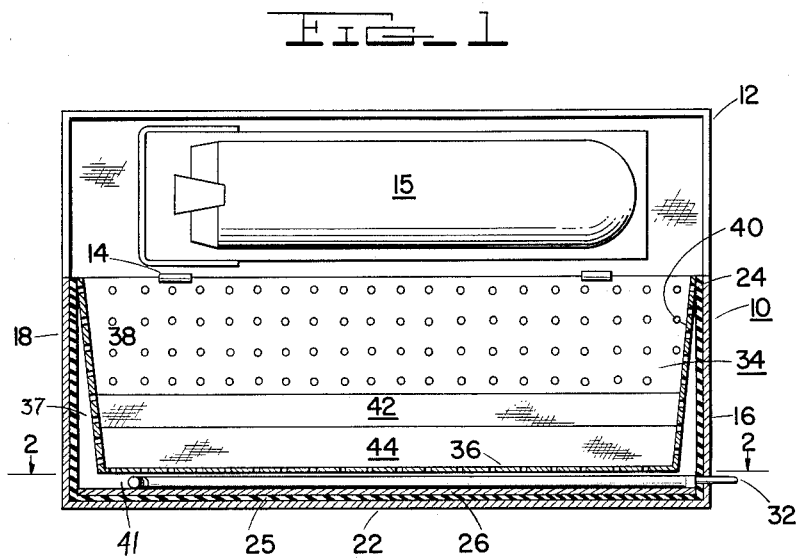
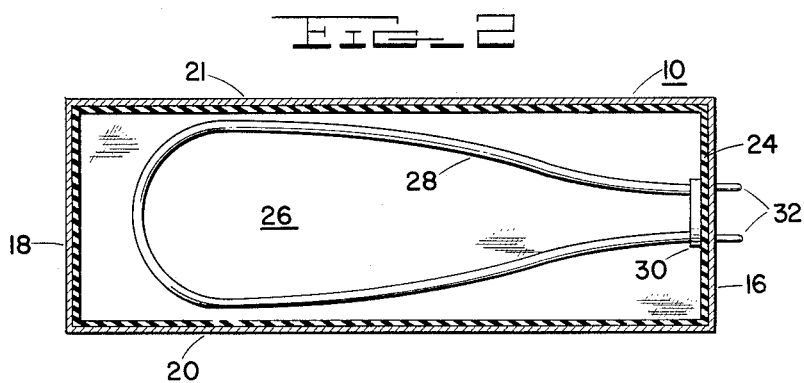
INVENTOR.
HOWARD G. FARRELL
BY Hood, Gust & Irish
ATTORNEYS Nov. 23, 1965   H. G. FARRELL   3,219,798
HEATED LUNCH BOX
Filed Sept. 10, 1963   2 Sheets-Sheet 2
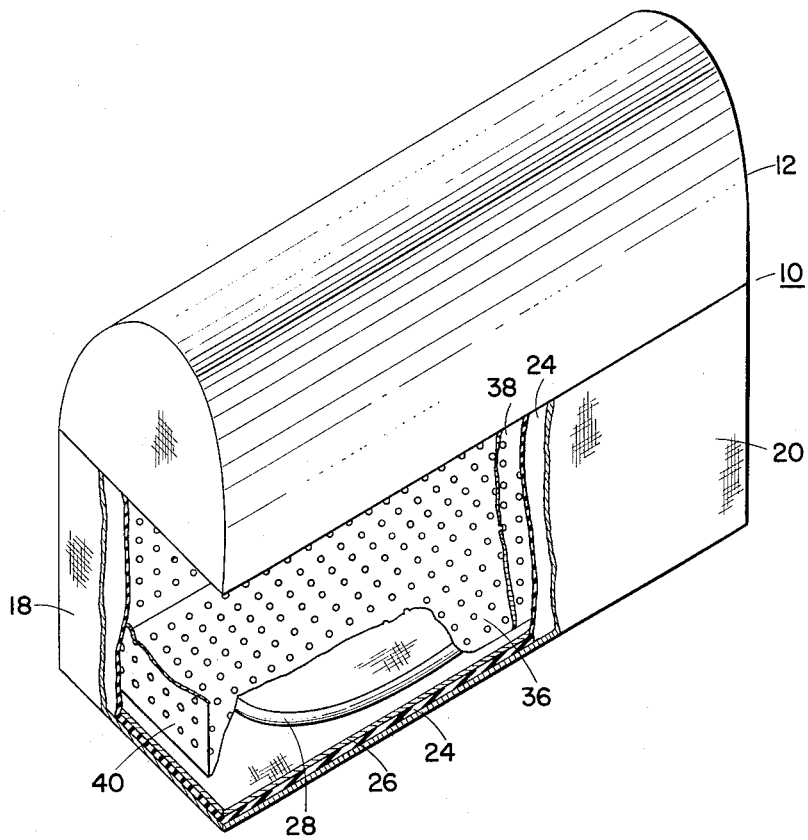
FIG_3
INVENTOR.
HOWARD G. FARRELL
BY Hood, Gust & Irish
ATTORNEYS

United States Patent Office 3,219,798
Patented Nov. 23, 1965

3,219,798
HEATED LUNCH BOX
Howard G. Farrell, 6016 Kent Road, Fort Wayne, Ind.
Filed Sept. 10, 1963, Ser. No. 307,903
1 Claim. (Cl. 219—387)

This invention relates generally to food warming containers and more particularly to a portable lunch warming container for warming precooked foods.

For years, the working man has carried his lunch to the job in containers having compartments for sandwiches, desserts, etc., and for a vacuum bottle for maintaining hot and cold drinks or soups at their desirable temperatures. Many variations of this basic lunch box have been proposed and are currently available. To bring variety into workmen's lunches, there have been several heated lunch boxes proposed for warming precooked foods such as meat, potatoes, and vegetables, or even for cooking foods. Such prior heated lunch boxes, however, have been intricate in design, relatively expensive, or have limited their contents by means of compartmenting the space therein provided for food. Further, none of such prior heated lunch boxes have been especially adapted for warming frozen, precooked meals. It is therefore desirable to provide a simple, inexpensive and uncompartmented heated lunch box.

Still further, none of the heretofore proposed devices known to the present applicant have been intended to convert a conventional lunch box into a food warmer, and it is therefore desirable to provide elements in kit form for readily converting a conventional lunch box into a food warmer.

It is accordingly an object of this invention to provide an improved heated lunch box that is simple in design.

It is another object of this invention to provide an improved heated lunch box that is inexpensively manufactured.

It is a further object of this invention to provide an improved heated lunch box that is not compartmented.

It is a still further object of this invention to provide elements whereby a conventional lunch box can be easily and inexpensively converted to an improved heated lunch box.

Further objects and advantages of my invention will become apparent by reference to the following description and the accompanying drawing, and the features of novelty which characterize my invention will be pointed out with particularity in the claim annexed to and forming a part of this specification.

The invention in its broader aspects provides a heated lunch box comprising a container proportioned so that a standard sized precooked food package may be inserted therein and having a perforated and heat-conductive liner containing the food package and spaced apart from the side walls of the lunch box by suitable thermal insulating material and from the bottom of the lunch box by a heating element, means for reflecting the heat from the heating element upwardly, and by insulation.

In the drawings:

FIG. 1 is a longitudinal side view, partially cross-sectional, of a conventional lunch box incorporating the invention and having its cover pivotally opened;

FIG. 2 is a cross-sectional view, taken along the line 2—2 of FIG. 1; and

FIG. 3 is a perspective view, partly broken away, of the lunch box of the invention with the precooked food packages removed.

Referring now to the figures of the drawings, there is shown at 10 a conventional, generally rectangular, metal lunch box having a cover 12 hingedly attached to the box 10 by means of hinge elements 14 with a conventional vacuum bottle 15 contained therein, and having ends 16 and 18, longitudinal sides 20, 21 and a bottom 22. Immediately adjacent and adhesively attached to the inner surfaces of walls 16, 18, 20 and 21 and bottom 22 and thereby covering these surfaces is located a sheet 24 of relatively thin thermal insulating material, preferably asbestos. Immediately adjacent and overlaying bottom portion 25 of the asbestos material sheet 24 is a heat conductive and reflective sheet or layer 26. In the preferred embodiment of this invention, the heat reflector 26 is preferably aluminum foil. Overlying heat reflector 26 is a conventional resistance heating element 28 preferably a Calrod unit, attached to a plug 30, having male members 32 for interconnection with a female plug portion and a cord (the female plug and cord not shown) leading to a source of electricity. An open topped liner 34 is provided formed of suitable perforated heat-conductive metal, such as sheet aluminum and having a bottom wall 36 smaller in each dimension than bottom 22. Liner 34 is positioned within box 10 with its bottom wall 36 engaging and overlaying heating element 28 and forming air space 37 with layer 26. Side walls 38 and end walls 40 of liner 34 respectively overlay but are angularly disposed to the portions of insulator sheet 24 which are attached to box walls 16, 18, 20 and 21 thereby providing an air space 41 between the same box walls and liner 34.

Sheet material 24, liner 34 and box walls 16, 18, 20 and 21 are forcibly held in juxtaposition and in contact with each other, respectively, by walls 38, 40 of liner 34 which inclined outwardly from the perpendicular, as shown. Bottom 22 is substantially "five-ply" by means of bottom 36, layer 24, reflector 26, air space 37, and liner 34 overlaying bottom 22, and further differs from the side walls in that heating element 28 overlies layer 26 lying within air space 37.

Perforated heat conductive liner 34 forms the interior surface of the heated lunch box of the present invention. FIG. 1 shows a plurality of precooked and packaged food containers 42, 44 (which may be of the frozen variety) placed in lunch box 10 and are supported upon bottom 36 of heat conductive perforated liner 34. While the lunch box of this invention may be compartmented to permit the use of certain sized precooked food packages, the preferred embodiment as shown in the drawings is uncompartmented thereby allowing the maximum versatility in choosing and packaging the food desired.

In operation, the workman packs his lunch by choosing the food desired in frozen precooked packages and placing them within lunch box 10, resting successively on heat-conductive perforated liner 34 and the other precooked food packages before he goes to work. Upon arriving at work, the lunch box 10 is stored in the same fashion as the more conventional lunch boxes until lunch is desired. Prior to lunch time, lunch box 10 is interconnected to a female plug attached to a cord leading to an electrical source, by means of male elements 32, and thereby supplying electricity to heating element 28. Heating element 28 becomes warm, its heat reflects from heat reflector 26 upwards at perforated heat-conductive member 34 thereby warming all surfaces of liner 34 equally by conduction through member 34, convection through air spaces 37 and 41, and radiation from reflector 26. Insulating element 24 minimizes the loss of heat through the walls 16, 18, 20, 21 and bottom 22 thereby retaining a large portion of the heat generated within box 10 and causing all surfaces of liner 34 to radiate inwardly most effectively. After a short time has elapsed, precooked food containers are warmed to serving temperatures and the workman can commence eating his lunch.

Various modifications in the actual operation of this invention are possible. As the heat is very easily distributed by means of heat conductive liner 34, there is no restriction as to the position that precooked food must have within lunch box 10 to achieve the desired temperature. Further, the heated lunch box 10 as described can be used to thaw the precooked food, if frozen, as well as warming the food, if desired.

While I have illustrated and described a specific embodiment of my invention, further modifications and improvements will occur to those skilled in the art and I desire therefore in the appended claim to cover all modifications which do not depart from the spirit and scope of my invention.

What is claimed is:

A heated lunch box comprising a rectangular container having four sides, a bottom and a cover, each of said sides, bottom and cover having an inside surface, a thermal insulating asbestos sheet adjacent and covering the inside surfaces of said sides and said bottom, a heat reflector comprising a sheet of aluminum foil overlying and adjacent said asbestos sheet on said bottom, an electrical heating coil overlying and adjacent said reflector; a male plug member operatively connected to said coil whereby said coil may be connected to a source of electricity, a perforated heat conductive liner overlying and adjacent said insulating sheet on said sides and said heating coil on said bottom, said liner being of relatively thin sheet aluminum, the sides of said liner respectively being inclined outwardly and defining air spaces with said asbestos sheet on said sides and bottom, said liner defining the interior of said container wherein a package of precooked food may be warmed.

References Cited by the Examiner

UNITED STATES PATENTS

| | | | |
|---|---|---|---|
| 2,187,196 | 1/1940 | Douglass | 219—415 X |
| 2,505,405 | 4/1950 | Jarboe | 219—387 |
| 2,889,443 | 6/1959 | Dobmeier | 219—415 X |

RICHARD M. WOOD, *Primary Examiner.*